US012459322B2

(12) United States Patent
Tucker et al.

(10) Patent No.: US 12,459,322 B2
(45) Date of Patent: Nov. 4, 2025

(54) INDEPENDENT AND CROSS-LINKED HYDRAULIC ACTUATOR SYSTEMS

(71) Applicant: ClearMotion, Inc., Billerica, MA (US)

(72) Inventors: Clive Tucker, Charlestown, MA (US); Marco Giovanardi, Melrose, MA (US); Jack A. Ekchian, Belmont, MA (US)

(73) Assignee: ClearMotion, Inc., Billerica, MA (US)

( * ) Notice: Subject to any disclaimer, the term of this patent is extended or adjusted under 35 U.S.C. 154(b) by 448 days.

(21) Appl. No.: 16/500,669

(22) PCT Filed: May 31, 2018

(86) PCT No.: PCT/US2018/035290
§ 371 (c)(1),
(2) Date: Oct. 3, 2019

(87) PCT Pub. No.: WO2018/226494
PCT Pub. Date: Dec. 13, 2018

(65) Prior Publication Data
US 2020/0223274 A1    Jul. 16, 2020

Related U.S. Application Data

(60) Provisional application No. 62/516,848, filed on Jun. 8, 2017.

(51) Int. Cl.
*B60G 15/06* (2006.01)
*B60G 13/08* (2006.01)
(Continued)

(52) U.S. Cl.
CPC ........... *B60G 15/062* (2013.01); *B60G 13/08* (2013.01); *B60G 17/0272* (2013.01); *B60G 21/055* (2013.01); *F16F 9/18* (2013.01)

(58) Field of Classification Search
CPC .... B60G 13/08; B60G 15/062; B60G 21/055; B60G 21/06; B60G 17/0272; F16F 9/18
(Continued)

(56) References Cited

U.S. PATENT DOCUMENTS 5,040,823 A    8/1991    Lund
5,575,502 A    11/1996    Oppitz et al.
(Continued)

FOREIGN PATENT DOCUMENTS

DE    19920109 A1 *    11/2000    ............. B60G 17/04
DE    10227417 A1    2/2004
(Continued)

OTHER PUBLICATIONS

PCT/US2018/35290, Oct. 22, 2018, International Search Report and Written Opinion.
(Continued)

*Primary Examiner* — Christopher P Schwartz
(74) *Attorney, Agent, or Firm* — Wolf, Greenfield & Sacks, P.C.

(57) ABSTRACT

Apparatus and methods are described where multiple linear and/or rotary actuators operate cooperatively in, for example, cross-linked arrangements to control the motion of sprung and unsprung masses in a vehicle. The actuators may include linear primary suspension actuators, spring perch actuators and/or rotary roll-bar actuators that, in some operating modes, are driven directly or indirectly by one or more hydraulic machines.

17 Claims, 10 Drawing Sheets

(51) Int. Cl.
  *B60G 17/027* (2006.01)
  *B60G 21/055* (2006.01)
  *F16F 9/18* (2006.01)

(58) Field of Classification Search
  USPC ............... 180/165; 188/314, 315, 317, 318,
           188/322.19, 322.21; 267/34, 64.16,
           267/64.17, 220–222
  See application file for complete search history.

(56) References Cited

U.S. PATENT DOCUMENTS

| | | | | |
|---|---|---|---|---|
| 5,700,027 | A * | 12/1997 | Schiffler | F16F 9/12 |
| | | | | 280/124.162 |
| 5,735,540 | A | 4/1998 | Schiffler | |
| 6,249,728 | B1 | 6/2001 | Streiter | |
| 6,282,471 | B1 | 8/2001 | Burdock et al. | |
| 7,051,526 | B2 * | 5/2006 | Geiger | F16D 48/02 |
| | | | | 60/475 |
| 7,494,133 | B2 | 2/2009 | Schroder | |
| 7,686,309 | B2 * | 3/2010 | Munday | B60G 21/06 |
| | | | | 280/5.507 |
| 7,753,385 | B2 | 7/2010 | Bitter | |
| 8,887,882 | B2 * | 11/2014 | Beck | F16F 9/063 |
| | | | | 188/322.17 |
| 9,068,616 | B1 * | 6/2015 | Serbu | F16F 9/56 |
| 9,272,598 | B2 * | 3/2016 | Kazmirski | B60G 17/0272 |
| 9,586,456 | B2 * | 3/2017 | Reybrouck | B60G 15/063 |
| 10,377,371 | B2 * | 8/2019 | Anderson | B60G 17/02 |
| 10,434,835 | B2 * | 10/2019 | Six | F15B 13/027 |
| 10,814,690 | B1 * | 10/2020 | Katzourakis | B60G 17/0165 |
| 10,906,371 | B2 * | 2/2021 | Belter | B60G 7/006 |
| 2005/0199457 | A1 * | 9/2005 | Beck | B60G 17/0272 |
| | | | | 188/314 |
| 2008/0257626 | A1 * | 10/2008 | Carabelli | F03G 7/08 |
| | | | | 180/165 |
| 2008/0269987 | A1 | 10/2008 | Barron et al. | |
| 2008/0272561 | A1 * | 11/2008 | Monk | B60G 21/06 |
| | | | | 280/5.507 |
| 2010/0072760 | A1 * | 3/2010 | Anderson | B60K 25/10 |
| | | | | 290/1 R |
| 2011/0187065 | A1 * | 8/2011 | Van Der Knaap | B60G 17/016 |
| | | | | 280/5.507 |
| 2014/0288776 | A1 | 9/2014 | Anderson et al. | |
| 2016/0059664 | A1 | 3/2016 | Tucker et al. | |
| 2022/0185056 | A1 * | 6/2022 | Belter | F16F 9/512 |
| 2024/0010039 | A1 * | 1/2024 | Selden | F15B 21/008 |

FOREIGN PATENT DOCUMENTS

| | | |
|---|---|---|
| EP | 0239754 A1 | 10/1987 |
| GB | 2235168 A | 2/1991 |
| WO | WO 2015/153811 A1 | 10/2015 |
| WO | WO 2017/112946 A1 | 6/2017 |
| WO | WO 2018/148689 A1 | 8/2018 |

OTHER PUBLICATIONS

International Search Report and Written Opinion for International Application No. PCT/US2018/35290 mailed Oct. 22, 2018.

* cited by examiner

INDEPENDENT AND CROSS-LINKED HYDRAULIC ACTUATOR SYSTEMS

CROSS REFERENCE OF RELATED APPLICATIONS

This application is a national stage filing under 35 U.S.C. § 371 of International Patent Application Serial No. PCT/US2018/035290, filed May 31, 2018, which claims the benefit of priority under 35 U.S.C. § 119 (e) of U.S. Provisional Application Ser. No. 62/516,848, filed Jun. 8, 2017, the disclosures of each of which are incorporated herein by reference in their entirety.

FIELD

Methods and embodiments for cross-linking hydraulic actuators.

BACKGROUND

Vehicle suspension systems are used to at least partially isolate a vehicle body and shield vehicle occupants from road and/or acceleration induced disturbances.

For example, when a wheel of a vehicle traverses a speed bump or pothole, the suspension system acts to reduce the amount of wheel displacement that is transferred to the vehicle body.

In addition, vehicles navigating a turn may be exposed to lateral and fore-aft accelerations that may cause the vehicle body to roll about the vehicle's roll axis or to pitch. During a turn, outside suspension elements (the side of the vehicle furthest from the center of rotation) are typically exposed to increased compressive forces due to lateral acceleration while the inside suspension elements may be exposed to increased tensional effects. An active suspension system may, for example, be used to resist those roll-induced compression or tensional forces, at least to some extent.

Furthermore, under certain circumstances, ride-height of the vehicle may also be intentionally altered to accommodate changes in vehicle weight and/or to modify its aerodynamic drag coefficient.

SUMMARY

The motion of the vehicle body, as a result of road-induced and/or inertially induced disturbances, may be modified by using multiple actuators to apply a force or forces on the vehicle body. For example, actuators may be interposed between the vehicle body (i.e., sprung mass) and a wheel assembly (i.e., unsprung mass) to control the relative motion between them. Additionally or alternatively, in some embodiments, actuators may be interposed between a suspension spring and the vehicle body and/or between a suspension spring and a wheel assembly. In some embodiments, an active roll bar actuator or actuators may be used to induce a roll moment in the front and/or rear of the vehicle, to for example counteract an acceleration-induced roll moment.

In one aspect, an active suspension system is disclosed that includes a first hydraulic actuator system with: a first hydraulic device (e.g., a hydraulic machine in a power-pack, a hydraulic motor-pump, a hydraulic pump), a first primary hydraulic actuator directly driven or powered by the first hydraulic device, and a first perch actuator indirectly driven by the first hydraulic device, wherein the first primary hydraulic actuator includes a first compression volume and a first extension volume. In certain embodiments, the first actuator system may also include a first multi-source hydraulic intensifier with a first port in fluid communication with the first compression volume, a second port in fluid communication with the first extension volume, and a third port in fluid communication with a first volume of the first perch actuator.

In certain embodiments, the suspension system may further include a second actuator system that includes: a second hydraulic device (e.g., a hydraulic machine in a power-pack, a hydraulic motor-pump, a hydraulic pump), a second primary hydraulic actuator directly driven by the second hydraulic device, and a second perch actuator indirectly driven by the second hydraulic device, wherein the second hydraulic actuator includes a second compression volume and a second extension volume. In certain embodiments, the second actuator system may further include a second multi-source hydraulic intensifier with a first port in fluid communication with the second compression volume, a second port in fluid communication with the second extension volume, and a third port in fluid communication with a first volume of the second perch actuator. In certain embodiments, the first multi-source hydraulic intensifier has a fourth port that is in fluid communication with a fourth port of the second multi-source hydraulic intensifier.

In certain embodiments the first perch actuator is interposed between a first suspension spring and a first wheel assembly and the second perch actuator is interposed between a second suspension spring and a second wheel assembly. In certain embodiments, the first suspension spring is in a coil-over arrangement with the first primary actuator, and the second suspension spring is in a coil-over arrangement with the second primary actuator.

In certain embodiments, the first hydraulic actuator of the first actuator system is interposed between a first wheel assembly and a body of the vehicle and the second hydraulic actuator of the second actuator system is interposed between a second wheel assembly and the body of the vehicle.

In certain embodiments, the first hydraulic device is a hydraulic motor-pump and the second hydraulic device is a hydraulic motor-pump.

In another aspect, an active suspension system is disclosed, the active suspension system comprising: a first hydraulic actuator system that includes a first hydraulic device (e.g., a hydraulic machine in a power-pack, a hydraulic motor-pump, a hydraulic pump), and a first primary hydraulic actuator directly powered by the first hydraulic device, wherein the first primary hydraulic actuator includes a first compression volume and an first extension volume; a second hydraulic actuator system that includes a second hydraulic device (e.g., a hydraulic machine in a power-pack, a hydraulic motor-pump, a hydraulic pump), a second primary hydraulic actuator directly driven by the second hydraulic device, wherein the second primary hydraulic actuator includes a second compression volume and an second extension volume; a rotary hydraulic roll bar actuator operatively coupled to a roll bar and configured to be driven by a combination of the first and second hydraulic devices. In certain embodiments, in at least one mode of operation, the first primary hydraulic actuator, the second primary hydraulic actuator and the rotary hydraulic roll bar actuator cooperatively apply a roll moment to the vehicle body.

In certain embodiments, the roll bar actuator includes a first chamber that is in fluid communication with the first compression volume, a second chamber that is fluid communication with the first extension volume, a third chamber that is in fluid communication with the second compression volume, and a fourth chamber that is fluid communication with the second extension volume. In certain embodiments, in at least one mode of operation, the first hydraulic device produces a pressure differential between the first and the second chambers that induces a first roll moment in the roll bar, and the second hydraulic device produces a pressure differential between the third and the fourth chambers that induces a second roll moment in the roll bar. In certain embodiments, the first and second roll moments are in the same direction.

In yet another aspect, passive multi-source hydraulic intensifier is disclosed, the intensifier comprising: a housing including at least a first, second, and third mutually sealed, variable volume chambers, wherein each chamber is at least partially filled with a fluid at a first, second, and third pressure respectively; a multi-surface piston assembly having a first surface exposed to the first pressure, a second surface exposed to the second pressure, and a third surface that is exposed to the third pressure, wherein the relative volumes of the three chambers is a function, at least in part, of the position of the piston assembly relative to the housing. In certain embodiments, in at least one mode of operation the pressure in the first chamber is a function of at least the second pressure and the third pressure.

In certain embodiments, the passive multi-source hydraulic intensifier further includes a first port fluidly connecting the first chamber to a first external volume, and a second port fluidly connecting the second chamber to a second external volume, wherein the first and second chambers are at least partially filled with hydraulic fluid, and wherein the pressures in the first and second external volumes are determined by at least one external pressure source (or source of pressure). In certain embodiments, the third chamber is at least partially filled with a gas. In certain embodiments, the intensifier includes a third port fluidly connecting the third chamber to a third external volume.

In certain embodiments, of the passive multi-source hydraulic intensifier, the first external volume is a compression volume of a primary actuator of a first actuator system, the second external volume is an extension volume of the primary actuator of the first actuator system, and the third external volume is an internal volume of a spring perch actuator. In certain embodiments, the intensifier includes a fourth chamber that is at least partially filled with hydraulic fluid, and a fourth port that fluidly connects, via a flow path, the fourth chamber to a chamber of a second multi-source hydraulic intensifier. The second multi-source hydraulic intensifier may be part of a second actuator system that includes a second primary actuator and a second spring perch actuator. In certain embodiments, the fourth port is also in selective fluid communication with a fluid reservoir may be: a reservoir that is open to the atmosphere or a pressurized reservoir that may be pressurize by a quantity of gas trapped in the reservoir. In certain embodiments, the first and second actuator systems are a part of an active suspension system of a vehicle. In certain embodiments, the first and second primary actuators and first and second spring perch actuators are configured to work cooperatively to apply one or more moments on the vehicle body.

It should be appreciated that the foregoing concepts and additional concepts discussed below may be arranged in any suitable combination, as the present disclosure is not limited in this respect. Further, other advantages and novel features of the present disclosure will become apparent from the following detailed description of various non-limiting embodiments when considered in conjunction with the accompanying figures.

DESCRIPTION OF FIGURES

The accompanying figures are not intended to be to scale unless otherwise explicitly indicated. In the figures, each identical or nearly identical component that is illustrated in the various figures may be represented by a like numeral. For purposes of clarity, not every component may be labeled in every figure. In the figures.

DETAILED DESCRIPTION

A glossary of some terms or phrases used in this disclosure is included at the end of this section.

In an active suspension system, one or more hydraulic actuators may be used individually or co-operatively to control various aspects of vehicle body and/or wheel motion. In some embodiments, multiple suspension actuators may be used co-operatively to control, for example, heave, pitch, roll and/or ride-height of the vehicle body.

In some embodiments, an active suspension system may include one or more hydraulic actuator systems. Each such actuator system may include, for example, multiple linear and/or rotary actuators that are driven or powered directly or indirectly by an electro-hydraulic power-pack. In some embodiments, fluid communication between at least one volume of the first actuator and a port of the hydraulic device of the power-pack and/or a port of a multi-source pressure intensifier and a volume in the second actuator may, at least in certain operating modes, be regulated by a hydraulic pulsation mitigation filter.

In certain embodiments, a hydraulic actuator system may include one or more hydraulic actuators. For example, a hydraulic actuator system may include a linear primary hydraulic actuator and a second actuator which may be, for example, a linear spring perch actuator or a rotary hydraulic actuator, for example, a roll bar actuator. Multiple hydraulic actuator systems may cooperate in various combinations to apply a roll and/or pitch moment to the vehicle body and/or adjust vehicle height (or maintain it at different vehicle loads) In some embodiments, Multiple hydraulic actuator systems may also cooperate to control at least some aspects the vehicle body (sprung mass) motion. Additionally or alternatively, actuator systems may be used to control at least some aspects of wheel (i.e., unsprung mass) motion, for example, during heave, pitch, or roll of the vehicle body. Pressure intensifiers may be used, for example, to boost or otherwise adjust pressure and modify applied forces during certain modes of operation or transfer pressure from a first location in a given actuator system to a second location in the same or other actuator system.

Figure 1:
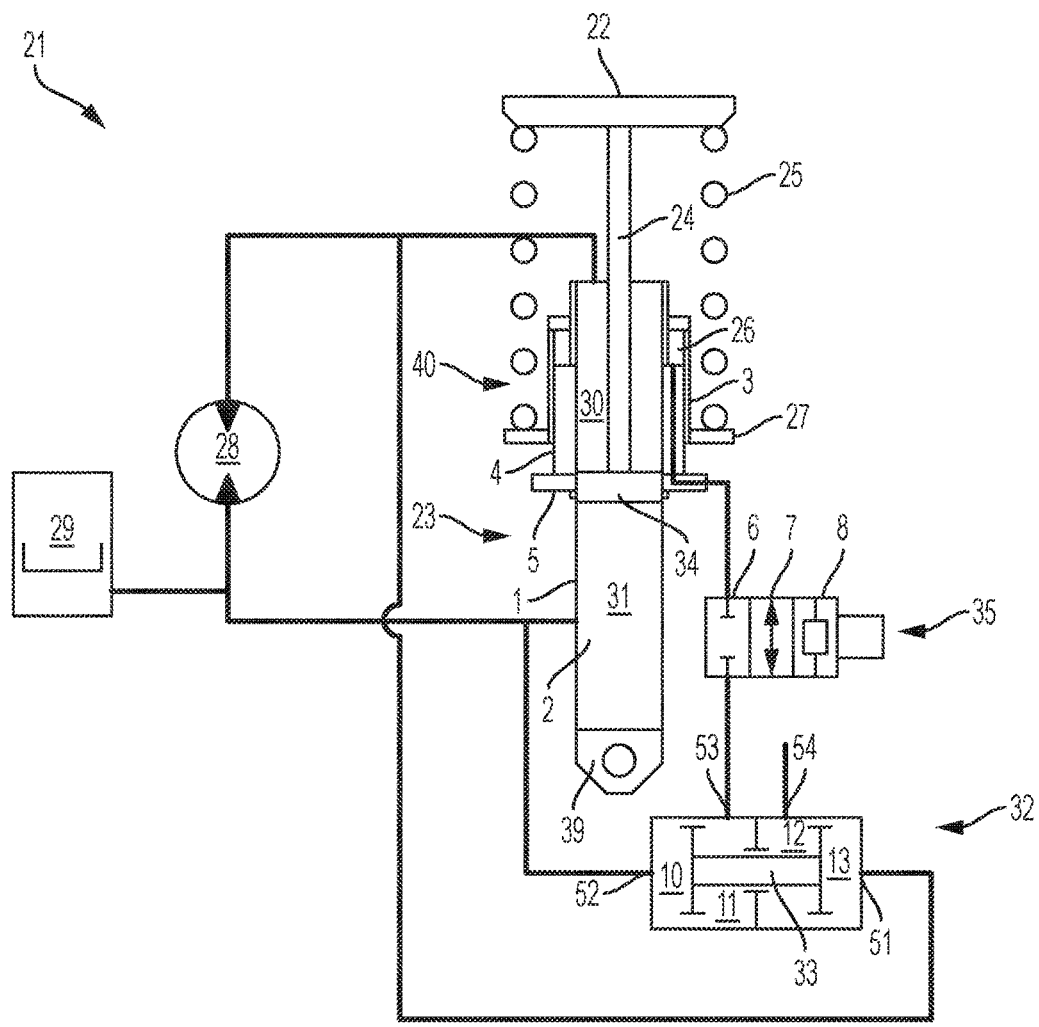
FIG. 1 illustrates an embodiment of a hydraulic actuator system.

FIG. 1 illustrates an embodiment of a hydraulic actuator system 21 which may be incorporated in an active suspension system of a vehicle. The hydraulic actuator system may include a primary linear hydraulic actuator 23, which may be interposed between a wheel assembly (i.e., unsprung mass) and the vehicle body (i.e., sprung mass) 22 of a vehicle. In some embodiments, actuator 23 may be in parallel or effectively in parallel with suspension spring 25. The suspension spring 25 of the embodiment in FIG. 1 is supported by movable spring perch 27 that may be actuated by a second actuator such as, for example, perch actuator 40. In the embodiment of FIG. 1, the wheel assembly (not shown) may be attached to the actuator 23 at eyelet 39.

The primary linear hydraulic actuator 23 of the actuator system 21 may include a piston 34 that is slidably received in an internal volume 2. The piston 34 divides the internal volume 2 of the actuator 23 into a compression volume 31 and an extension volume 30. Piston rod 24 may be attached to piston 34 at a first end and vehicle body 22 at a second end. The piston rod may be attached to the vehicle body 22 via an intervening top mount or other attachment device (not shown).

During compression of the linear actuator 23 (i.e., when the compression volume contracts), as the piston rod 24 penetrates further into the housing 1 of the actuator, a quantity of liquid may be displaced by the piston rod. In certain embodiments, this quantity of fluid may be received, for example, in a gas-charged accumulator 29 which may be, for example, located outside the housing or incorporated within the housing. When the piston rod is withdrawn during extension (i.e. when the extension volume contracts), fluid may be returned to the housing from the gas-charged accumulator 29.

Equilibrium pressure in the compression and extension volumes (for example when the hydraulic motor-pump 28 is turned off, and pressures have equilibrated) may be determined by the gas pre-charge pressure in accumulator 29. In some embodiments, accumulator 29 may include a compressible medium, such as for example nitrogen gas or air, that may be separated from the hydraulic fluid by, for example, a piston, a diaphragm, or other appropriate separation device.

In the embodiment illustrated in FIG. 1, in order to apply a force on the vehicle body 22 and/or the wheel assembly, hydraulic motor-pump 28 may be used to establish a differential pressure between the extension volume and compression volume in actuator 23. In certain embodiments, the hydraulic motor-pump 28 may be operatively coupled to an electric motor-generator (not shown) to form an electro-mechanical power-pack. In the embodiment illustrated in FIG. 1, suspension spring 25 is interposed between vehicle body 22 and an adjustable spring perch 27. Suspension spring 25 may be, for example, a coil spring, air spring, or any other appropriate compliant spring-like component or device that may support at least a portion of the weight of the vehicle body 22.

In the embodiment illustrated in FIG. 1, the hydraulic actuator system 21 may include a second linear actuator for adjusting the relative position of the spring and wheel assembly and/or the vehicle body, such as, for example, spring perch or seat actuator 40. In the depicted embodiment, the second actuator 40 may include an axially adjustable spring perch 27 that supports one end of helical suspension spring 25. The spring perch actuator 40 may include an internal volume 26 that may be in selective fluid communication with hydraulic multi-source pressure intensifier 32. The fluid communication between the volume 26 and the hydraulic multi-source pressure intensifier 32 may be controlled, for example, by a three-position flow control valve 35 or another appropriate flow control device. In certain embodiments, the three-position flow control valve may be, for example, a solenoid valve that includes three distinct elements: a flow shut-off element, a free flow element, and a hydraulic pulsation mitigation filter element. The pulsation mitigation filter may be, for example, an orifice. The valve may be positioned alternatively to insert any one of these elements in the flow path between internal volume 26 and the hydraulic multi-source pressure intensifier 32.

During certain modes of operation, volume 26 may be hydraulically sealed, by using the flow control device 35 to insert element 6 into the flow path and locking spring perch 27 in-place relative to element 4 and housing 1.

During certain modes of operation, the three-position flow control valve 35 may be positioned to insert element 8 which may be for example, an impedance, restriction, orifice, or other fluidic low-pass filter into the flow path in order to prevent pulsations, for example, above a predetermined frequency threshold, from reaching volume 26 or alternatively to mitigate the amplitude of such pulsations above a certain threshold frequency that do reach volume 26. In some embodiments the threshold frequency may be, for example, 1 Hz, 2 Hz, 3 Hz, 4 Hz, 5 Hz, 6 Hz, 7 Hz, 8 Hz, 9 Hz, 10 Hz, 11 Hz, 12 Hz, 13 Hz, 14 Hz, or 15 Hz. Other threshold frequencies are also contemplated as the disclosure is not so limited.

In the embodiment illustrated in FIG. 1, the active spring perch actuator 40 includes an annular piston 3 with a first end and a second end. A central opening may be located at a first end that slidably and sealingly receives the outer surface of housing 1. A second larger opening may be located at a second end that slidably and sealingly receives the outer cylindrical surface of annular element 4. The internal annular volume 26 is defined by the inner surface of the annular piston, the outer surface of the housing 1, and the annular element 4. Spring perch 27 is formed by a radially outwardly extending shoulder fixedly attached to or integral with annular piston 3. In some embodiments, fluid may be forced into annular volume 26 to apply force on the annular piston 3 that is directed along the longitudinal axis of the housing 1, causing it to slide away from wheel assembly. Alternatively, distance between the spring perch and the wheel assembly may be reduced by allowing fluid to flow out of volume 26. In some embodiments, the spring perch actuator 40 may be used to adjust the vehicle ride height by changing the distance between the spring perch and the wheel assembly. Alternatively or additionally, the spring perch actuator 40 may be used to supplement the primary actuator 23, for example, to control the pitch and/or roll angles of the vehicle.

In some embodiments, a feature of element 4 may be used to provide a positive stop to limit the maximum downward travel of the annular piston 3 relative to the actuator housing 1. Annular outwardly extending shoulder 5, that may be integral with or fixedly attached to annular element 4, may be used as such a positive stop. Therefore, in some embodiments during some modes of operation, the annular piston may rest on the positive stop 5 when the force applied on the annular piston 3 by spring 25 is greater than the counteracting axial force applied on the annular piston as a result of the fluid pressure in volume 26. The annular piston may lift off (i.e., not rest on) the positive stop 5 during operation when and if enough fluid pressure is provided to volume 26. Alternatively or additionally, the positive stop may be provided as a fail-safe device that may be used, for example, when the system malfunctions or pressure in volume 26 is accidentally lost.

Valve 35 may be a solenoid valve, or any other appropriate flow control device. It should be understood that the pressure of the fluid in the annular volume 26 may be adjusted by operating pump 28 in conjunction with valve 35.

The hydraulic actuator system 21 in FIG. 1 may include a hydraulic multi-source pressure intensifier 32. The hydraulic multi-source pressure intensifier 32 of FIG. 1 is illustrated in more detail in FIG. 2. The embodiment of the intensifier in FIGS. 1 and 3 includes four ports. Ports 51 and 52 are in fluid communication with the extension volume and compression volume, respectively, of hydraulic actuator 23. Port 53 is in selective fluid communication with volume 26 of the perch actuator 40. Port 54 may be in fluid communication with another hydraulic device such as, for example, a second multi-source pressure intensifier of another hydraulic actuator system, another pressure source, a volume in another actuator. Alternatively, in some embodiments, port 54 may be in fluid communication with the atmosphere.

Figure 2:
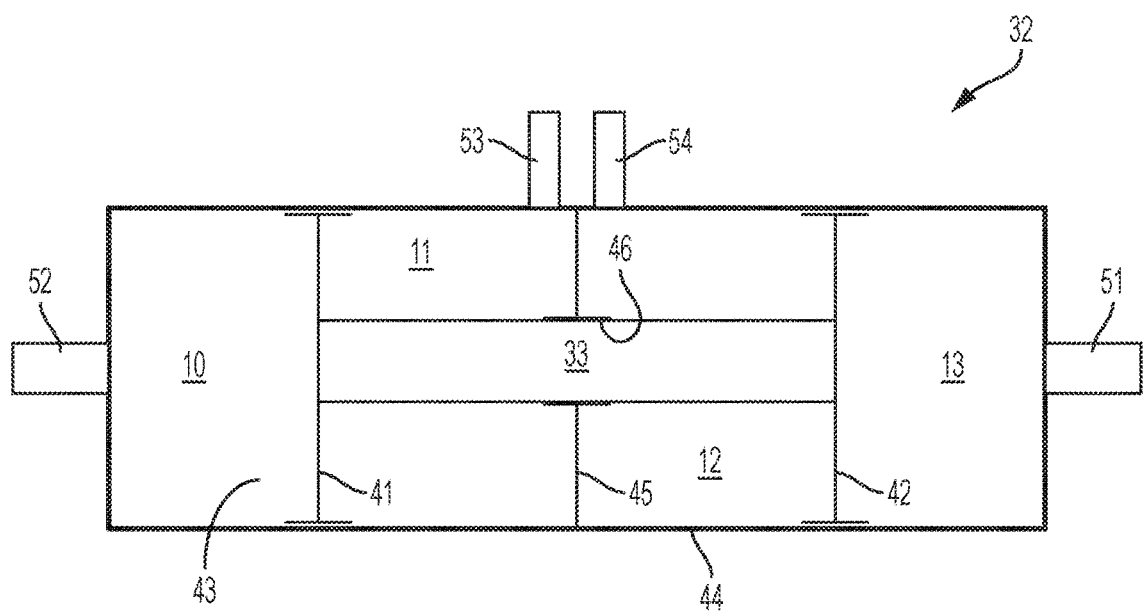
FIG. 2 illustrates an embodiment of a multi-source pressure intensifier with four chambers and four ports.

The embodiment of the multi-source intensifier 32 illustrated in FIG. 2 includes a piston rod 33 with a first end and a second end. Piston 41 is attached to the first end of piston rod 33 while piston 42 is attached to the second end to form a piston assembly. Pistons 41 and 42 are slidably and sealingly received in an internal cylindrical volume 43 of housing 44 of the multi-source pressure intensifier. The intensifier housing 44 includes an integral radially inwardly extending web 45 with central circular opening 46 that slidably and sealingly receives piston rod 33. The housing 44, the pistons 41 and 42, the web 45, and the piston rod 33 divides the internal volume 43 into four intensifier chambers 10, and 11 which may be cylindrical, and chambers 12, and 13 which may be annular. Changes in the relative size of the chamber volumes depends on the position of the piston assembly relative to the housing 44.

During operation, fluid pressures in the four intensifier chambers produce forces that act on the piston assembly in a direction parallel to the longitudinal axis of piston rod 33. When the piston rod is not restrained (e.g., has not reached an end of its stroke) and is not accelerating, the forces will be in equilibrium and satisfy the equation:

$$F_a + F_c = F_b + F_d$$

where $F_a$ is the force applied to the non-rod side of piston 41 by the fluid in volume 10; $F_b$ is the force applied to the rod side of piston 41 by the fluid in volume 11; $F_c$ is the force applied to the rod side of piston 42 by the fluid in volume 12, and $F_d$ is the force applied to the non-rod side of piston 42 by the fluid in volume 13. In the force equilibrium equation above, one of ordinary skill in the art will recognize that during proper operation friction due to piston and rod seals (not shown) will be negligible compared to forces resulting from the applied pressure in the intensifier chambers. One of ordinary skill in the art will also recognize if friction due to one or more seals is significant, one or more frictional forces may also be considered and accounted for in the force balance equation.

In the embodiment in FIG. 2, the forces resulting from applied pressure may be determined by the following:

$$F_a = P_a * A_{NR}$$

$$F_b = P_b * A_R$$

$$F_c = P_c * A_R$$

$$F_d = P_d * A_{NR}$$

Where $P_a$, $P_b$, $P_c$ and $P_d$ are the pressures in chambers 10, 11, 12, and 13 respectively and $A_{NR}$ is the non-rod area of the pistons while $A_R$ is the rod side area of the pistons.

Under these conditions, the pressure provided by the intensifier at port 53 may be determined by using equation:

$$P_b = P_a(A_{NR}/A_R) + P_c - P_d(A_{NR}/A_R)$$

In FIG. 2, pistons 41 and 42 are shown as having equal diameter. It is noted that the piston assembly and housing 44 may be configured with pistons that have different areas as the disclosure is not so limited. If the areas are different the above equation will need to be adjusted to account for such difference.

Actuator systems, such as the embodiment illustrated in FIG. 1, may be located at one or more locations in a vehicle, such as for example at the corners of a vehicle. These actuator systems may be used to control at least some aspects of vehicle body and/or wheel motion.

Figure 3:
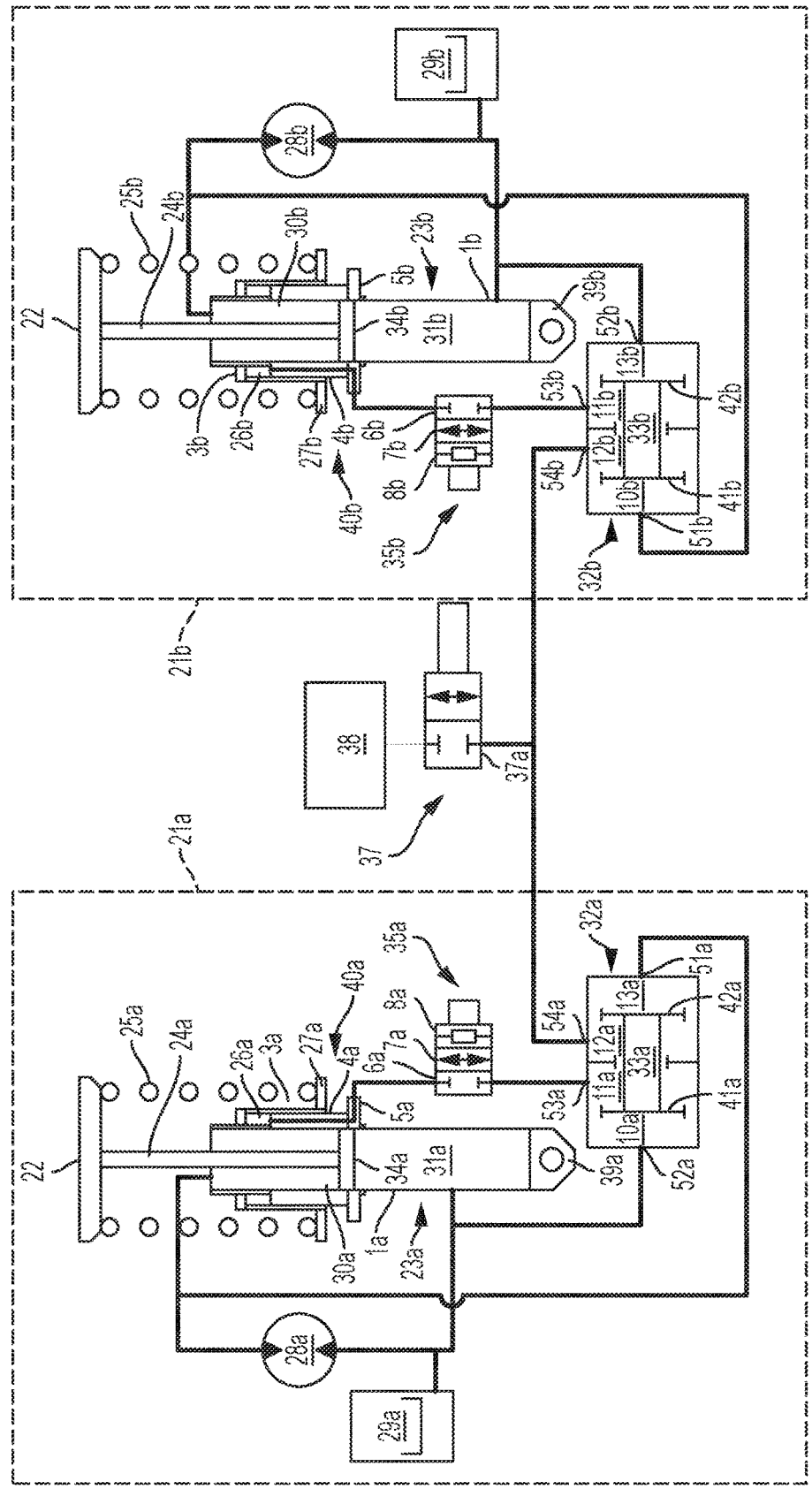
FIG. 3 illustrates an embodiment of an active suspension arrangement that includes two hydraulic actuator systems that are cross-linked.

In certain embodiments, multi-actuator systems, such as the system illustrated in FIG. 1, may be cross-linked with other actuators or actuator systems. FIG. 3 illustrates an embodiment of such a cross-linked arrangement. Elements in FIG. 3, similar or identical to those in FIG. 1, may be identified by the same element numbers followed by either the letter "a" or "b" to indicate that the element is a component of a first or a second actuator system, respectively, of the cross-linked suspension arrangement.

In FIG. 3, the first actuator system of the cross-linked suspension arrangement may be, for example, located at the front left corner of a vehicle and the second actuator system may be located at the front right corner of the vehicle. Alternatively, the actuator systems of the arrangement illustrated in FIG. 3 may be located elsewhere in a vehicle, such as for example, at the two rear corners. Alternatively, the actuator systems of the suspension arrangement may be located at, for example, two diagonally opposed corners.

Figure 4:
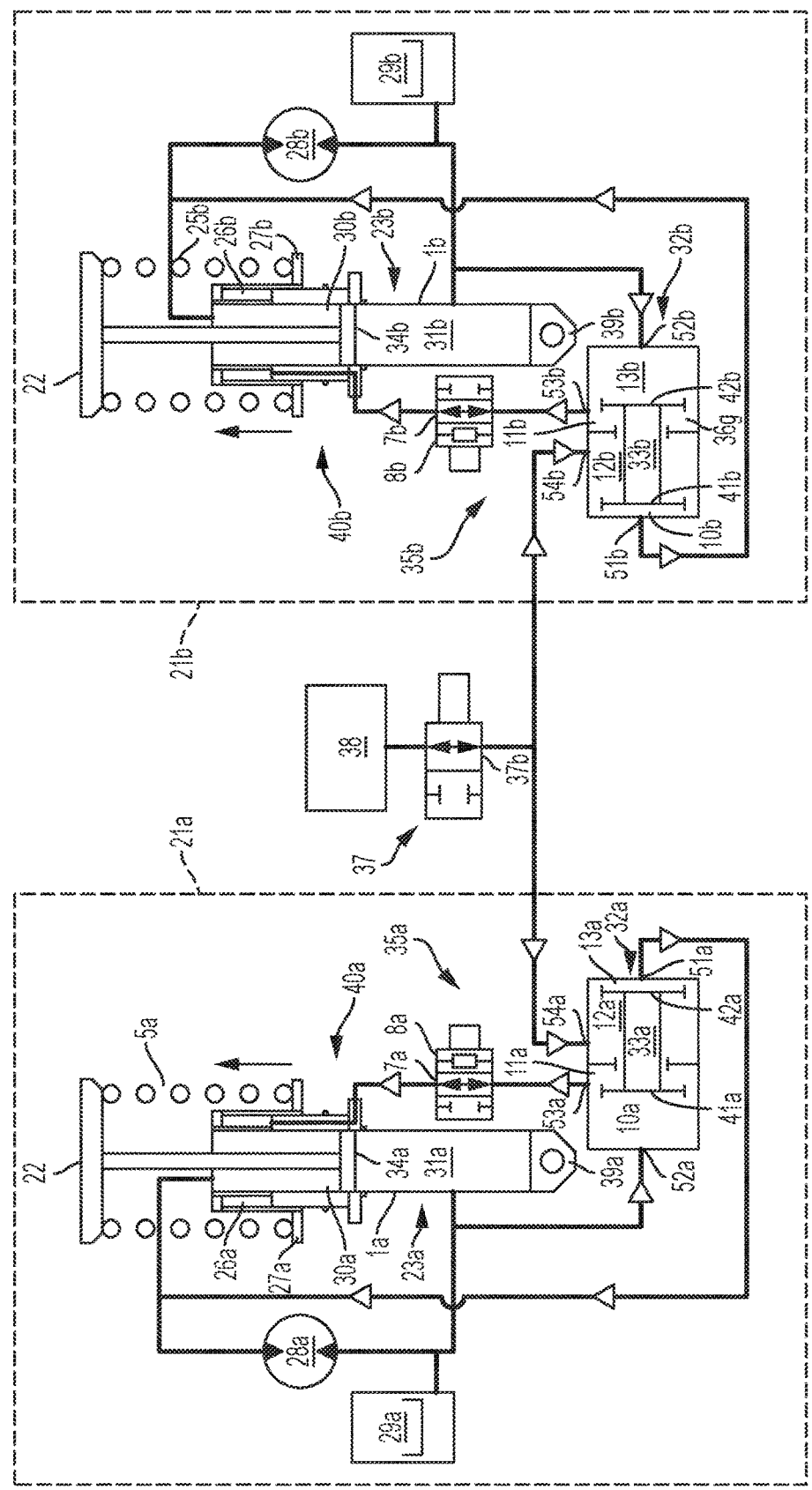
FIG. 4 illustrates the embodiment of FIG. 3 in an operating mode where the actuators from each actuator system apply forces in the same direction.

The embodiment in FIG. 4 illustrates the arrangement of FIG. 3, being used to control the motion of, for example, the front portion of a vehicle. Primary actuators 23a and/or 23b may be used to apply active and/or passive forces on the vehicle body 22. As illustrated in FIG. 4, forces applied by two actuators 21a and 21b may be generated by using the hydraulic motor-pumps 28a and 28b, respectively, to produce a differential pressure across pistons 34a and or 34b, respectively. Forces applied by these two actuators may be, for example, in the same direction or opposite directions, in phase or out of phase with each other and/or may be applied concurrently or at separate times to, at least in part, control vehicle body heave, pitch and/or roll and/or to control the motion of at least one wheel assembly. In at least one mode of operation, actuators 40a and/or 40b may remain locked in place relative to the housings 1a and 1b respectively and simply support the springs 25a and 25b respectively. The perch actuators 40a and/or 40b may be locked in place by positioning valves 35a and/or 35b in positions where elements 6a and 6b respectively are used to seal chambers volumes 26a and/or 26b. Alternatively the annular piston 3a and 3b may be allowed to rest on positive stops 27a or 27b respectively.

Alternatively or additionally, in a second mode of operation of the embodiment in FIG. 4, perch actuator(s) 40a and/or 40b may be used simultaneously and/or co-operatively with the primary hydraulic actuators 23a and/or 23b to, for example, control ride height of the vehicle. Forces applied by these four actuators may be generated by using the hydraulic motor-pumps 28a and 28b, to produce a differential pressure across pistons 34a and or 34b. The pumps may also be used to provide a pressure differential to ports 51a and 52a and/or ports 51b and 52b of multi-source pressure intensifiers 32a and/or 32b, respectively. For example, as illustrated in FIG. 3, motor-pumps 28a and 28b may be used to increase the pressure in each compression volume relative to each extension volume of the two primary actuators in order to apply a force to raise vehicle body 22 relative to the wheel assemblies.

The pressure differential produced by pumps 28a and 28b may also be applied across the multi-source pressure intensifiers 32a and 32b respectively. For example, the pressure differential applied across ports 51a and 52a of intensifier 32a (where the resulting pressure in the compression volume 31a is greater than the pressure in the extension volume 30a) may be used to compress volume 11a, forcing fluid into chamber 26a. Similarly, upward forces may be applied by actuator 23b and perch actuator 40b as a result of pressure differential produced by pump 28b (where the resulting pressure in the compression volume 31b is greater than the pressure in the extension volume 30b). After vehicle 22 is raised to a desired ride height as a result of the application of these four forces, the perch actuators may be locked in place by, for example, positioning valves 35a and 35b to insert 6a and 6b respectively in the flow paths between the volumes 26a and 26b, respectively, and the associated pressure intensifiers. In the multi-source pressure intensifiers 32a and 32b, while volumes 11a and 11b are compressed, both volumes 12a and 12b expand requiring additional fluid. This additional fluid may be supplied by a shared reservoir 38. This reservoir may be a gas pressurized closed volume reservoir or alternatively an open reservoir that is open to the atmosphere. To permit communication between the reservoir 38 and volumes 12a and 12b, valve 37 may be moved from a flow closed position to a position that allows free flow to occur.

In order to lower the vehicle, the pumps may be operated to increase the pressure in the extension volumes 30a and 30b relative to the corresponding compression volumes. Since the differential pressures are also applied to the multi-source pressure intensifiers in FIG. 4, the volumes 11a and 11b will expand while receiving flow from volumes 26a and 26b respectively. As volumes 12a and 12b are compressed, fluid is returned to reservoir 38. Alternatively, the vehicle 12 may be lowered, for example using valves 35a and 35b to insert elements 7a and 7b in the respective flow where the pumps 28a and 28b are not operating. In this mode, the weight of the vehicle may act to lower the vehicle without the intervention of a hydraulic pump. Valve 37 may be positioned to allow free flow to the reservoir 38 in order to accept flow from chambers 12a and 12b.

Figure 5:
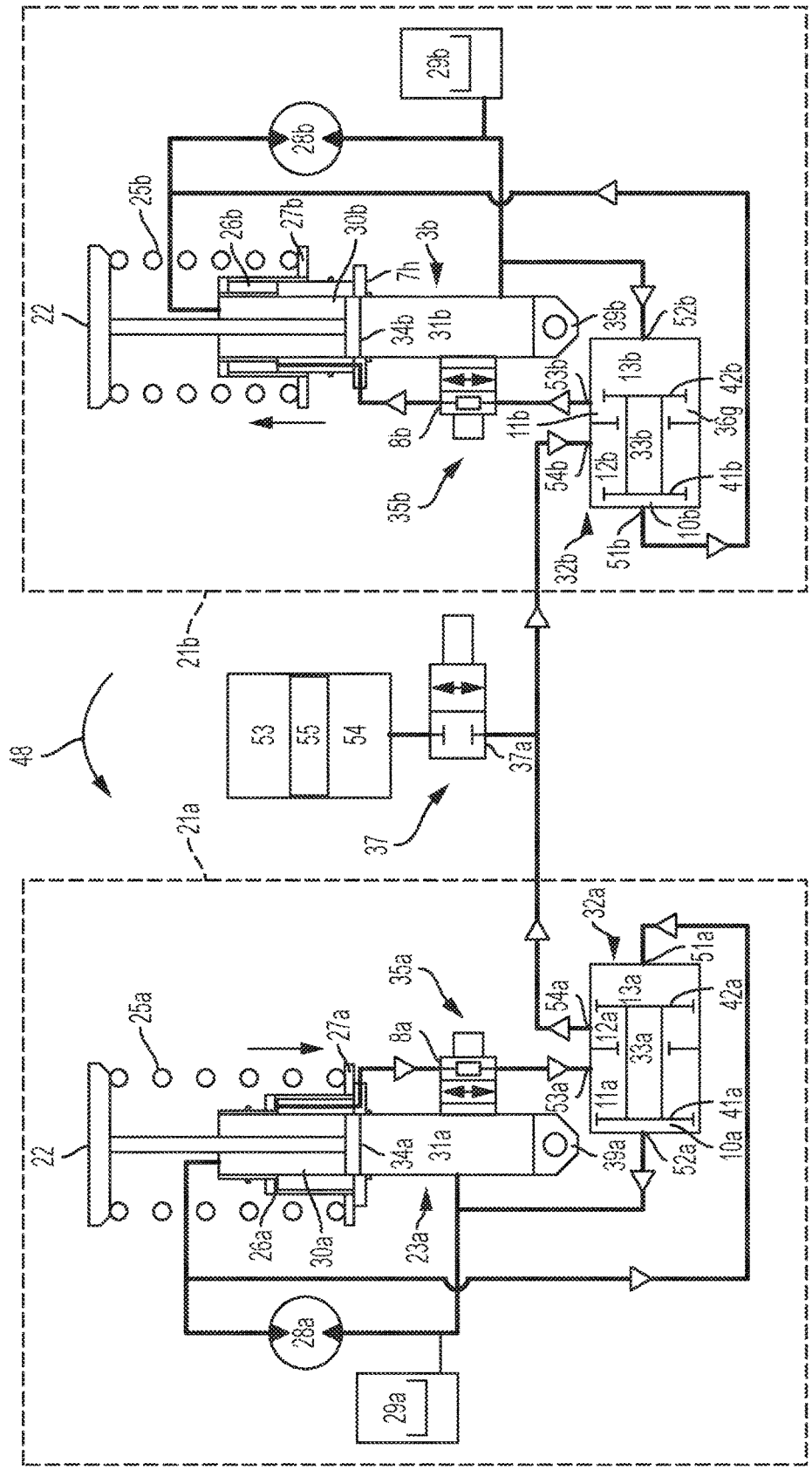
FIG. 5 illustrates the embodiment of FIG. 3 in an operating mode where the actuator systems apply a roll moment on the vehicle body.

In a third mode of operation, the hydraulic actuator systems illustrated in FIG. 3 may be used cooperatively to apply a roll moment in the direction 48 to the vehicle body, for example, to counteract the forces induced by lateral acceleration of the vehicle. As illustrated in FIG. 5, a counterclockwise roll moment may be applied, to for example counteract a clockwise roll moment that is applied to the vehicle by inertial forces, by using pump 28a to increase the pressure in extension volume 30a relative to the compression volume 31a, thus applying a net downward force with actuator 3a. This differential pressure may also be applied across the multi-source pressure intensifier 32a causing volume 11a to expand and thus receive fluid from volume 26a. In this mode of operation, valve 35a may be placed in position 8a in order to establish fluid communication between volume 36b and volume 26a via a hydraulic pulsation mitigation filter element contained in valve 35a.

This hydraulic pulsation mitigation filter may be configured, for example, as a low pass filter to allow pressure changes that are a certain low frequency threshold to pass through the filter element without mitigation or effectively without mitigation. The hydraulic filter may also be configured to mitigate or effectively mitigate pressure fluctuations that are higher in frequency than the threshold frequency.

Additionally or alternatively, the hydraulic motor pump 28b may be operated to increase the pressure in compression volume 31b relative to the pressure in the extension volume 30b. Since this differential pressure may also be applied across ports 52b and 51b of the multi-source pressure intensifier 32b, volume 11b may expand and receive fluid from 12a. In this embodiment, the pressures in volumes 10b, 11b, and 13b acting on the piston assembly in intensifier 32b will cause volume 12b to contract, forcing fluid into volume 26b through valve 35b. Valve 35b may be positioned in position 8b. As a result, the actuator system 21b may also apply a counterclockwise moment on vehicle body 22. In this mode of operation, actuators 23a and 40a in hydraulic actuator system 21a and actuator 23b and 40b in hydraulic actuator system 21b may work cooperatively to apply a moment to the vehicle body.

Figure 6:
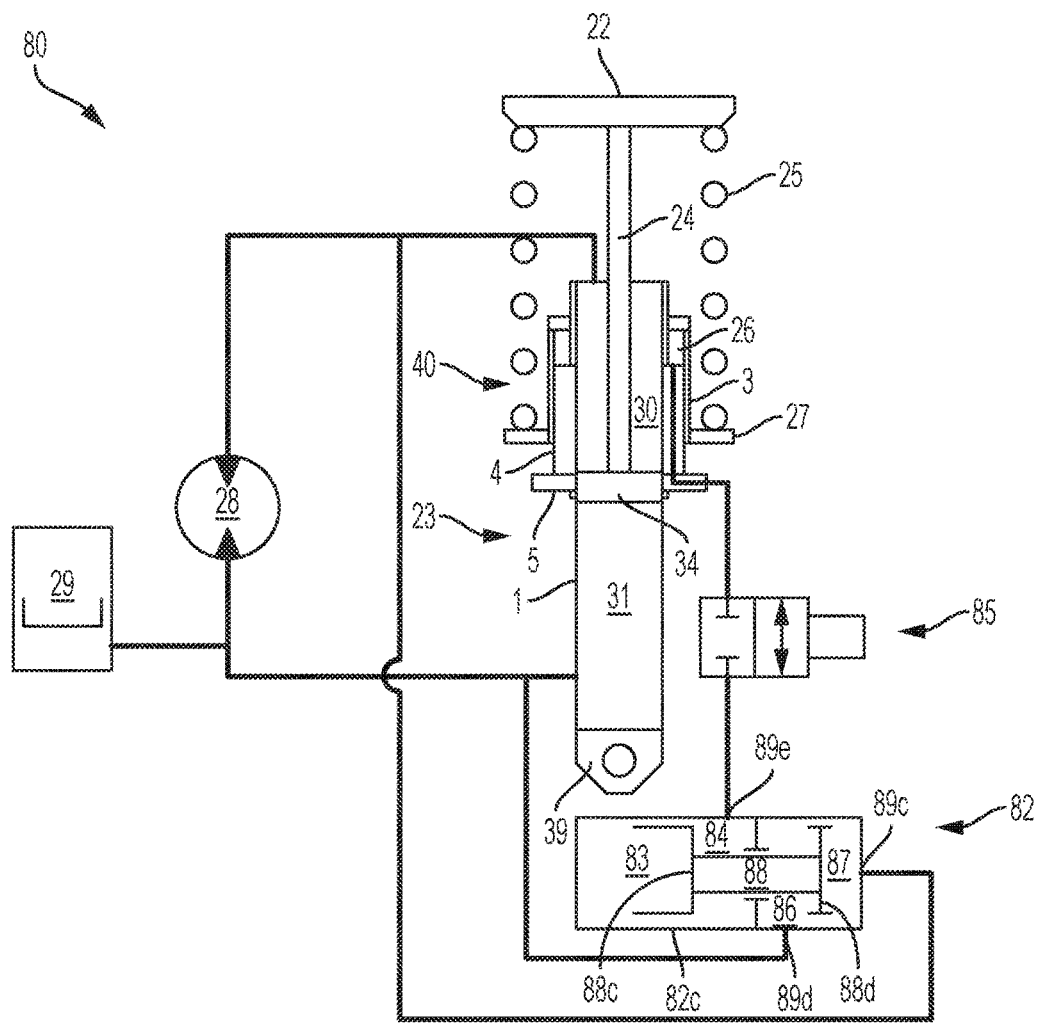
FIG. 6 illustrates an embodiment of a hydraulic actuator system that includes a multi-source pressure intensifier with an internal accumulator.

FIG. 6 illustrates an embodiment of a hydraulic actuator system 80 with a multisource pressure intensifier 82 that includes an integrated gas charged volume 83. As in the actuator system in FIG. 1, the hydraulic actuator system illustrated in FIG. 6 may include a primary linear hydraulic actuator 23, which may be interposed between a wheel assembly (i.e., unsprung mass) and the vehicle body (i.e., sprung mass) 22 of a vehicle. In some embodiments, actuator 23 may be in parallel or effectively in parallel with suspension spring 25. The suspension spring 25 of the embodiment in FIG. 6 is supported by movable spring perch 27 that may be actuated by a second actuator such as, for example, perch actuator 40.

In the embodiment illustrated in FIG. 6, in order to apply a force on the vehicle body 22 and/or the wheel assembly, hydraulic motor-pump 28 may be used to establish a differential pressure between the extension volume and compression volume in actuator 23.

In some embodiments, the hydraulic motor-pump 28 may be operatively coupled to an electric motor-generator (not shown) to form an electro-mechanical power-pack. In the embodiment illustrated in FIG. 6, suspension spring 25 is interposed between vehicle body 22 and an adjustable spring perch 27. Suspension spring 25 may be, for example, a coil spring, air spring, or any other appropriate compliant spring-like component or device that may support at least a portion of the weight of the vehicle body 22.

In the embodiment illustrated in FIG. 6, the hydraulic actuator system 21 may include a second linear actuator such as spring perch actuator 40. In the depicted embodiment, the second actuator 40 may include an axially adjustable spring perch 27 that supports one end of helical suspension spring 25. The position of perch 27 along the longitudinal axis of the actuator 23 may be adjusted by varying the pressure of the fluid in volume 26. The spring perch actuator 40 may include an internal volume 26 that may be in selective fluid communication with hydraulic multi-source pressure intensifier 82. The fluid communication between the volume 26 and the hydraulic multi-source pressure intensifier 82 may be controlled, for example, by a two-position flow control device 85 or another appropriate flow control valve. In certain embodiments, the two-position flow control device may be, for example, a solenoid valve that includes two distinct elements: a flow shut-off element, and a free flow element. The valve may be positioned alternatively to incorporate either of these elements in the flow path between internal volume 26 and the hydraulic multi-source pressure intensifier 82.

During certain modes of operation, volume 26 may be sealed, by using the flow control device 85 to insert the shut-off into the flow path such that spring perch 27 may be locked in-place relative to element 4 and housing 1. During certain modes of operation, the two-position flow control device 85 may be positioned to insert the free flow element into the flow path and permit fluid communication between volume 26 and chamber 84.

In the embodiment illustrated in FIG. 6, the active spring perch actuator 40 includes an annular piston 3 with a first end and a second end. A central opening may be located at a first end that slidably and sealingly receives the outer surface of housing 1. A second larger opening may be located at a second end that slidably and sealingly receives the outer surface of annular element 4. The internal annular volume 26 is defined by the annular piston, the outer surface of the housing 1, and the annular element 4. Spring perch 27 is formed by a radially outwardly extending shoulder fixedly attached to or integral with annular piston 3. In some embodiments, fluid may be forced into annular volume 26 to apply an axial force on the annular piston 3, causing it to slide away from wheel assembly. Alternatively, distance between the spring perch and the wheel assembly may be reduced by allowing fluid to flow out of volume 26. In some embodiments, the spring perch actuator may be used to adjust the vehicle ride height by changing the distance between the spring perch and the wheel assembly. Alternatively or additionally, the spring perch actuator may be used to control the pitch and/or roll angles of the vehicle.

In some embodiments, a feature of element 4, for example an annular outwardly extending shoulder, may be used to provide a positive stop to limit the maximum downward travel of the annular piston 3 relative to the actuator housing 1. Positive stop 5, may be integral with or fixedly attached to annular element 4, is such a feature. Therefore, in some embodiments during some modes of operation, the annular piston may rest on the positive stop 5 when the force applied on the annular piston 3 by spring 25 is greater than the counteracting axial force applied on the annular piston as a result of the fluid pressure in volume 26. The annular piston may lift off (i.e., not rest on) the positive stop 5 during operation when and if enough fluid pressure is provided to volume 26. Alternatively or additionally, the positive stop may be provided as a fail-safe device that may used, for example, when the system malfunctions or pressure in volume 26 is accidentally lost.

Valve 85 may be a solenoid valve, or any other appropriate flow control device. It should be understood that the pressure of the fluid in the annular volume 26 may be adjusted by operating hydraulic motor-pump 28 in conjunction with properly positioning valve 85.

The hydraulic actuator system 80 in FIG. 6 may include a hydraulic multi-source pressure intensifier 82. The embodiment of the intensifier in FIG. 6 includes three ports. Ports 89c and 89d are in fluid communication the extension volume and compression volume, respectively, of hydraulic actuator 23. Port 89e is in selective fluid communication with volume 26 of the perch actuator 40.

The embodiment of the multi-source intensifier 82 illustrated in FIG. 6 includes a piston rod 88 with a first end and a second end. A piston 88c is attached to the first end of piston rod 88 while piston 88d is attached to the second end thus forming a piston assembly. Pistons 88c and 88d are slidably and sealingly received in an internal cylindrical volume of the multi-source pressure intensifier. The intensifier housing 82c includes an integral radially inwardly extending web with central circular opening that slidably and sealingly receives piston rod 88. The housing 82c, the pistons 88c and 88d, the web, and the piston rod 88 divide the internal volume into four intensifier chambers 83, 84, 86, and 87. Changes in the relative size of the chamber volumes depends on the position of the piston assembly relative to the housing 82c.

In the embodiment illustrated in FIG. 6, in the multiport pressure intensifier 82, chamber 83 is a sealed gas filled chamber. During operation fluid pressures in the intensifier chambers produce forces that act on the piston assembly in a direction parallel to the longitudinal axis of piston rod 88. When the piston rod has not reached an end of its stroke and the piston assembly is not accelerating, the forces will be in equilibrium and satisfy the equation:

$$F_{gas}+F_c=F_b+F_d$$

where $F_{gas}$ is the force applied to the non-rod side of piston 88c by the gas in volume 83; $F_b$ is the force applied to the rod side of piston 88c by fluid in volume 84; $F_c$ is the force applied to the rod side of piston 88d by fluid in volume 86, and $F_d$ is the force applied to the non-rod side of piston 88d by fluid in volume 87. In the force equilibrium equation above, one of ordinary skill in the art will recognize that during proper operation, friction due to properly functioning piston and rod seals (not shown) will be negligible compared to forces resulting from the applied pressure in the intensifier chambers. One of ordinary skill in the art will also recognize that if seal friction is significant, one or more frictional forces may also be considered.

In the embodiment in FIG. 6, the forces resulting from applied pressure may be determined by the following:

$$F_{gas}=P_{gas}*A_{NR}$$

$$F_b=P_b*A_R$$

$$F_c=P_c*A_R$$

$$F_d=P_d*A_{NR}$$

Where $P_a$, $P_b$, $P_c$ and $P_d$ are the pressures in chambers 83, 84, 86, and 87 respectively and $A_{NR}$ is the non-rod area of the pistons while $A_R$ is the rod side area of the pistons.

Under these conditions, the pressure provided by the intensifier at port 89e may be determined by using equation:

$$P_b=P_{gas}(A_{NR}/A_R)+P_c-P_d(A_{NR}/A_R)$$

In this embodiment, the intensifier may be used to, for example, adjust the ride height of the vehicle body. Accumulator 83 may include a compressible medium, such as for example nitrogen gas or air, that may be separated from the hydraulic fluid by a piston or other separation device. In the illustrated embodiment in FIG. 6, accumulator 83 may change the compliance of intensifier 82 depending on the pre-set pressure of the compressible medium. In certain embodiments chamber 83 may be pre-charged to the same pressure as accumulator 29. In such embodiments, when pump 28 is not operating and valve 85 is positioned to permit fluid communication between volume 26 and chamber 84, a net force will be applied to the vehicle body that is equal to the pre-charge pressure multiplied by the cross sectional area of piston rod 24 and the pre-charge pressure multiplied by the effective area of annular piston 3. The effective area relates the pressure in volume 26 to the axial force applied by the annular piston. In certain embodiments, the chamber 83 may be pre-charged to the same pressure as accumulator 29.

Figure 7:
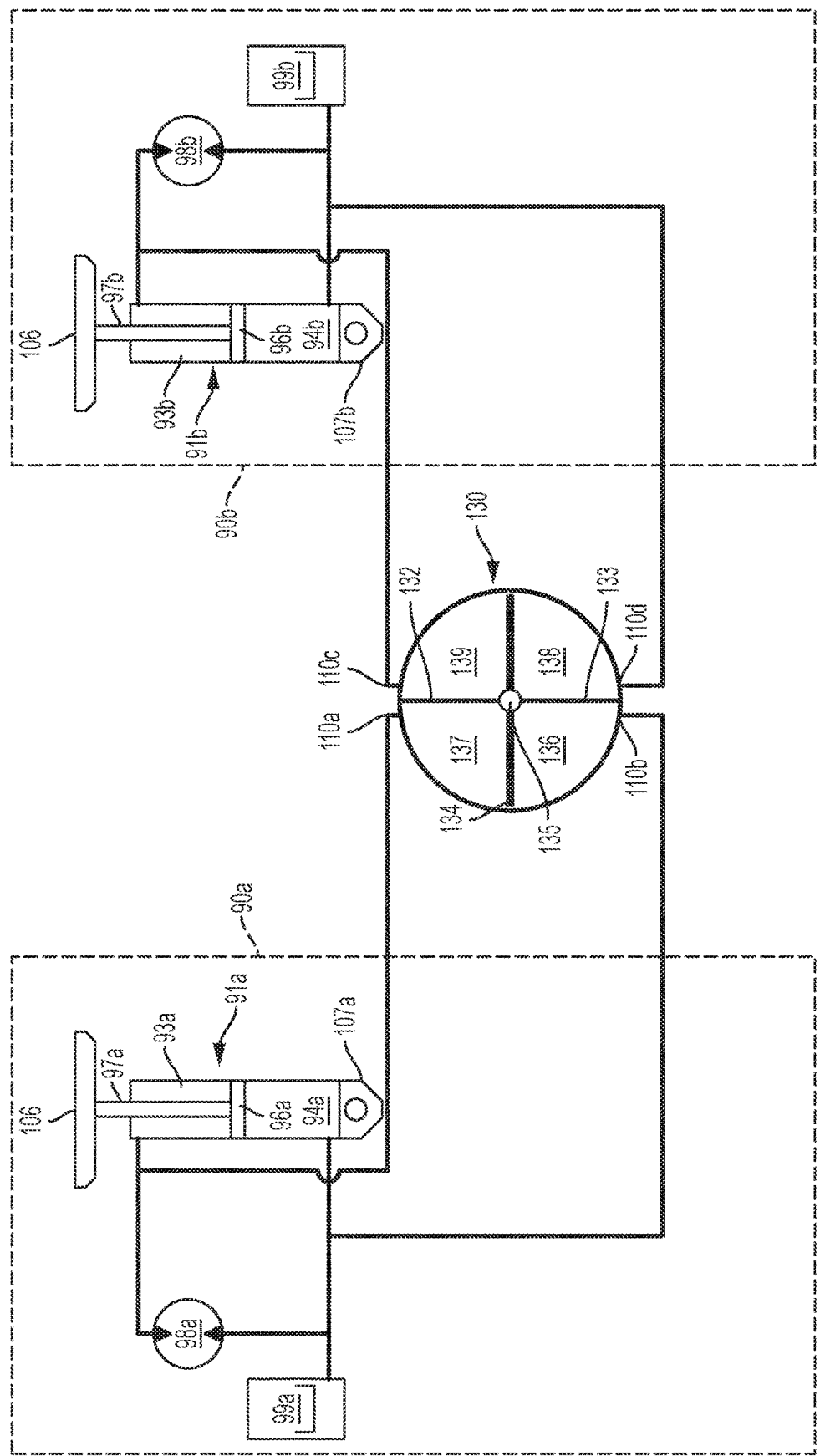
FIG. 7 illustrates an embodiment of two cross-linked hydraulic actuator systems that cooperate to drive a hydraulic rotary actuator.

In some embodiments, hydraulic actuator systems may operate in a cross-linked arrangement with one or more actuators such as, for example, a rotary hydraulic actuator. FIG. 7 illustrates two hydraulic actuator systems 90*a* and 90*b* which include primary actuators 91*a* and 91*b* respectively. Primary actuator 91*a* includes compression volume 94*a* and extension volume 93*a*. Primary actuator 91*b* includes compression volume 94*b* and extension volume 93*b*. Hydraulic device 98*a* and 98*b* may be used to produce a differential pressure between the compression volume and extension volume in actuators 91*a* and 91*b*.

Actuator system 90*a* and 90*b* may also include other linear and/or rotary hydraulic actuator, such as for example, spring perch actuators (not shown). The primary actuators 91*a* and 91*b* may be used to cooperatively drive rotary actuator 130.

Rotary actuator 130 may include a cylindrical housing 131, rotatable vane 134, and stationary vanes 132 and 133. The rotatable vane is attached to and supported by a shaft 135 that maintains the axis of rotation of the rotatable vane along the central axis of the cylindrical housing 131. The housing, the rotatable and stationary vanes form four cylindrical wedge-shaped chambers that are mutually sealed.

In the embodiment illustrated in FIG. 7, variable chambers 136, 137, 138, and 139 are in fluid communication with compression volume 94*a*, extension volume 93*a*, compression volume 94*b* and extension volume 93*b* respectively. Shaft 135 of the rotary actuator 130 may be used to apply a moment to, for example, a front roll-bar or rear roll-bar of a vehicle.

Figure 8:
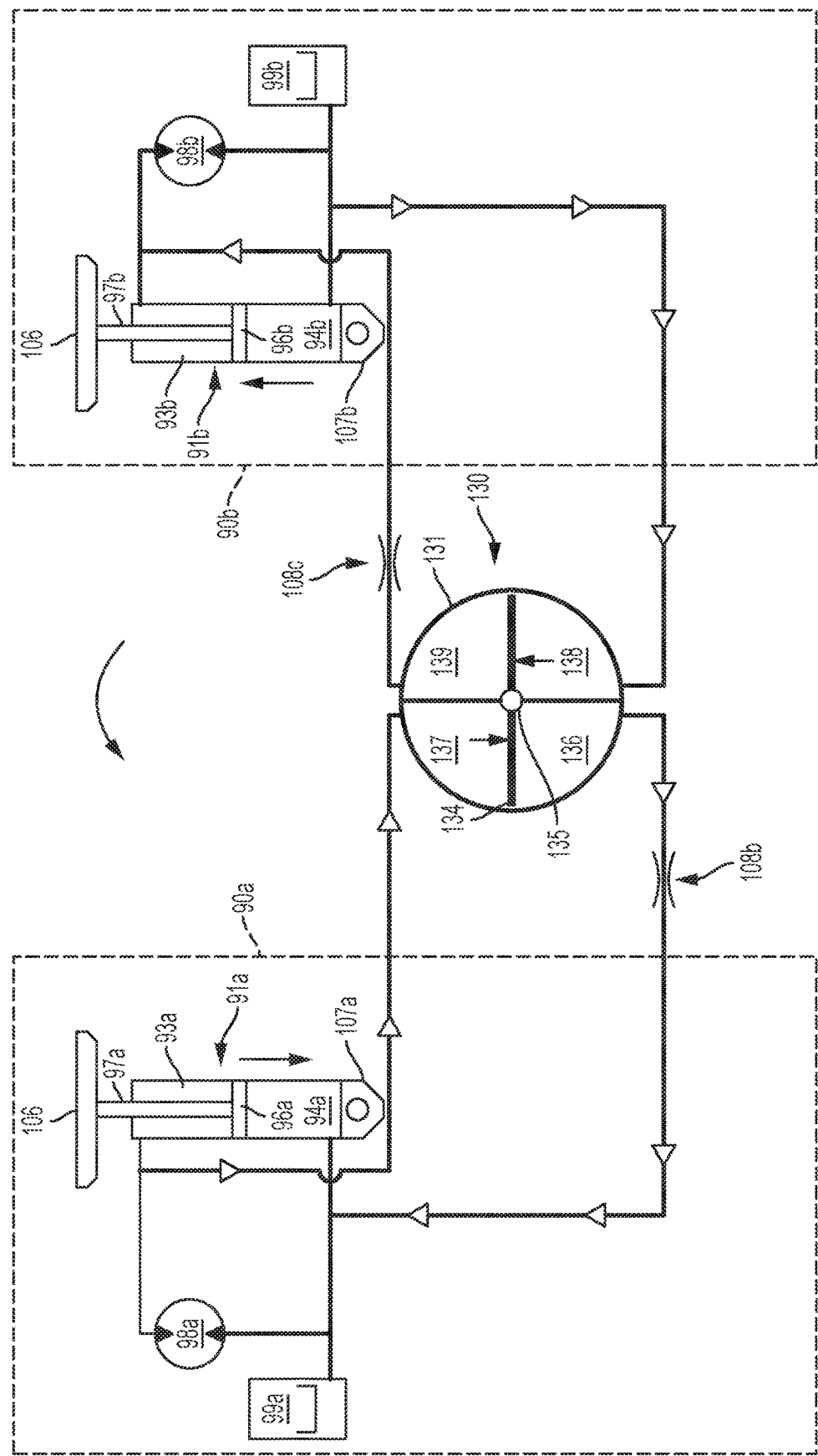
FIG. 8 illustrates another embodiment of two cross-linked hydraulic actuator systems that cooperate to drive a hydraulic rotary actuator via hydraulic filters.

FIG. 8 illustrates the interaction between the primary actuators 91*a* and 91*b* with the rotary actuator 130, where the system is used to apply a clockwise moment on a structure, such as a vehicle body.

The actuators 91*a* and 91*b* may be operationally interposed, for example, between a left rear wheel assembly, attached to eyelet 107*a*, and vehicle body 106 and a right rear wheel assembly, attached to eyelet 107*b*, and vehicle body 106, respectively. The rotary actuator 130 may be operatively interposed, for example, between two halves of a roll bar (not shown).

In one mode of operation illustrated in FIG. 8, a hydraulic motor-pump may be driven by an electric motor-generator (not shown) to apply a differential pressure across piston 96*a*. This differential pressure induces a force in piston rod 97*a* in the upward direction that is applied to the vehicle body. Similarly, a downward force may be applied to the body by piston rod 97*b*. The forces applied by the two piston rods may impart a clockwise moment to the vehicle body, to for example counteract a counter clockwise roll moment that is applied to the vehicle. The differential pressure generated by motor pump 98*a* may be applied to chambers 136 and 137. Additionally, the differential pressure generated by pump 98*b* may be applied to chambers 138 and 139. These differential pressures may be used to produce a torque on shaft 135, which may be used to apply a supplementary moment to the vehicle by means of the roll-bar. By effectively sealing the chambers of the rotary actuator, fluid exchange between the hydraulic circuits supplied by pumps 98*a* and 98*b* may be eliminated or minimized. Fluid filters 108 and 109, which may, for example, comprise of fluid restriction, may be used to isolate the rotary actuator from high frequency pulsations above a threshold frequency caused by, for example, the hydraulic pumps.

In some embodiments the threshold frequency may be, for example, 1 Hz, 2 Hz, 3 Hz, 4 Hz, 5 Hz, 6 Hz, 7 Hz, 8 Hz, 9 Hz, 10 Hz, 11 Hz, 12 Hz, 13 Hz, 14 Hz, or 15 Hz. Other threshold frequencies are also contemplated as the disclosure is not so limited.

Figure 9:
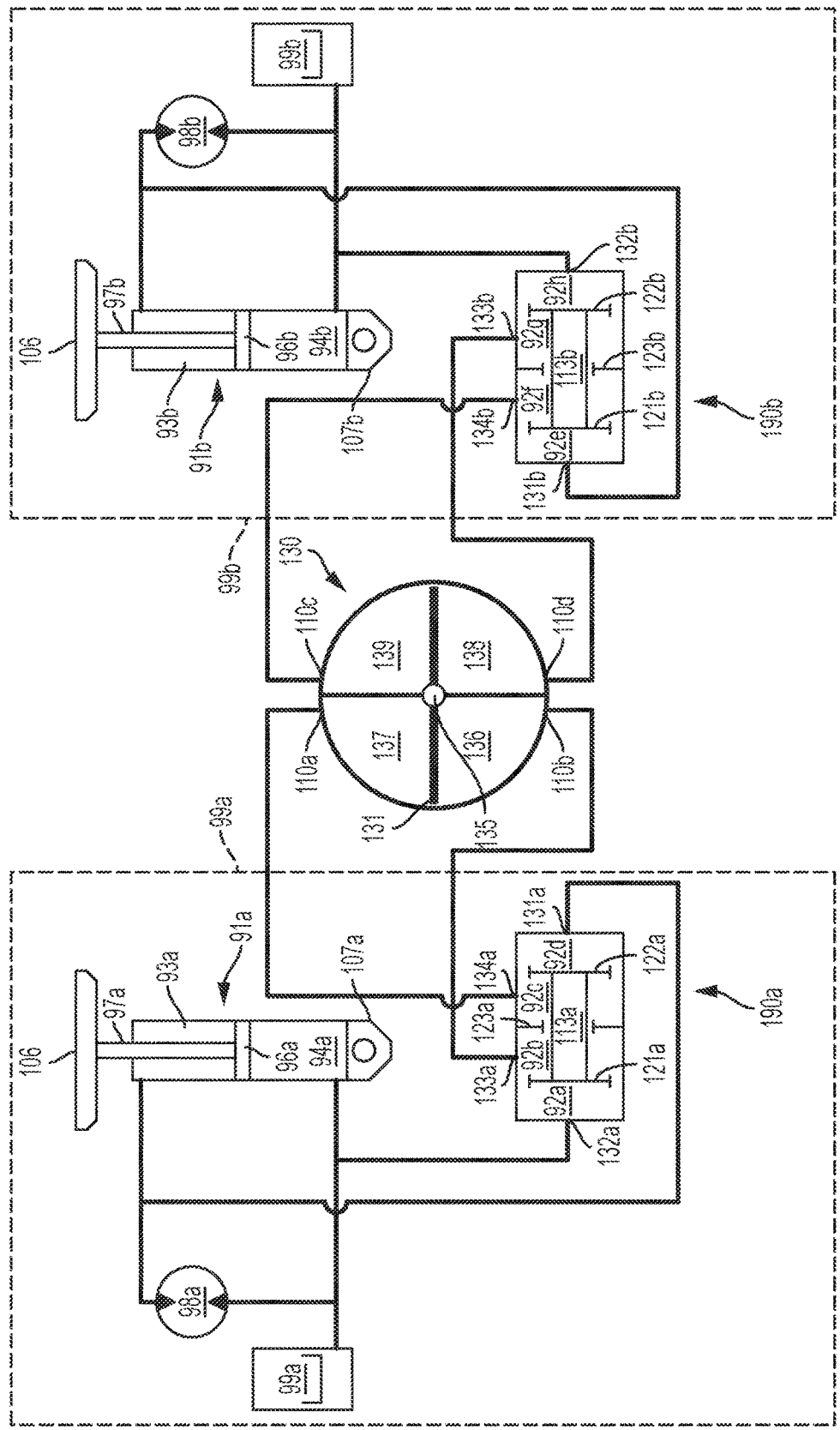
FIG. 9 illustrates a further embodiment of two cross-linked hydraulic actuator systems that cooperate to drive a hydraulic rotary actuator via pressure intensifiers.
Figure 10:
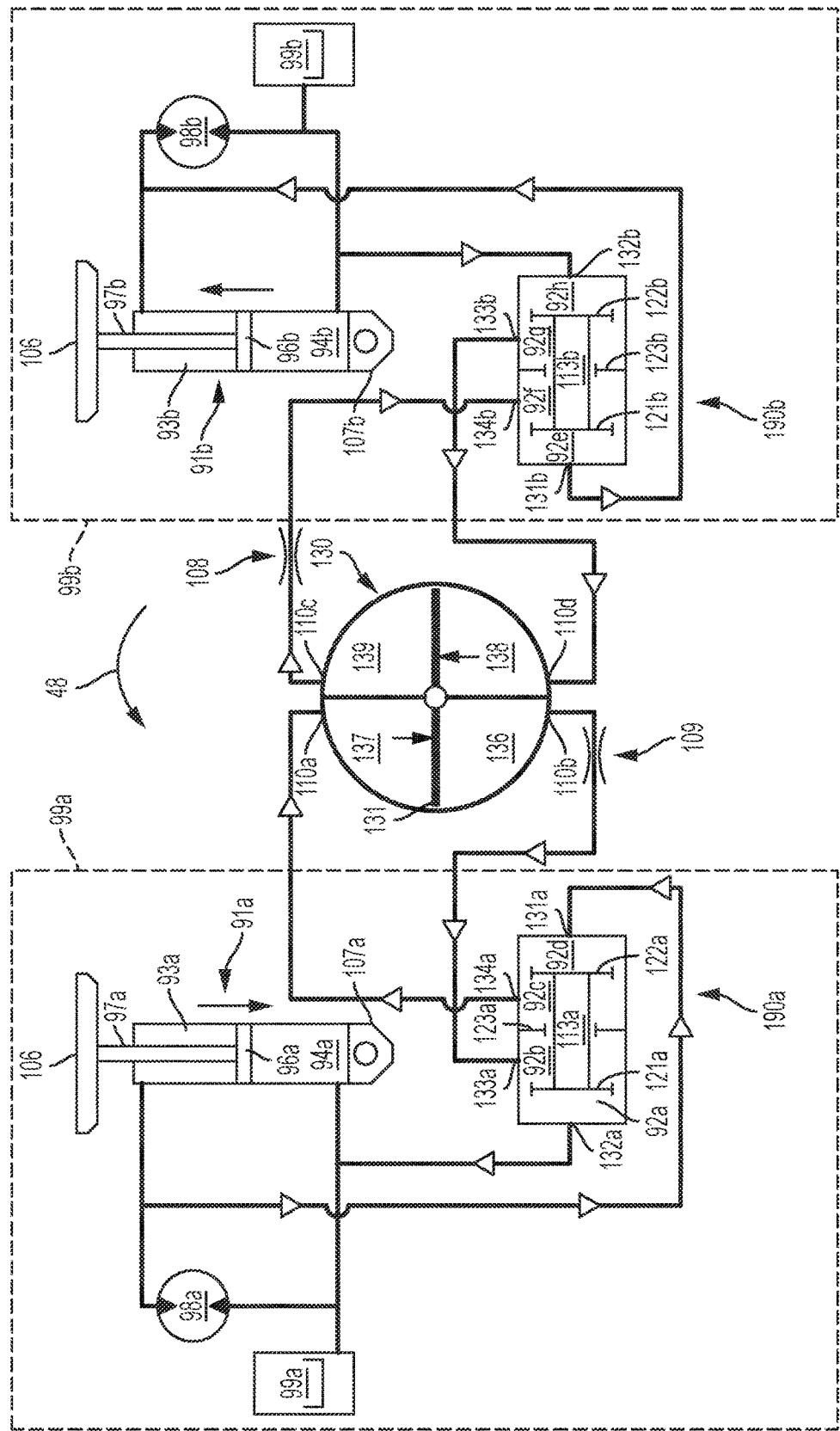
FIG. 10 illustrates a further embodiment of two cross-linked hydraulic actuator systems that cooperate to drive a hydraulic rotary actuator via pressure intensifiers and hydraulic filters to apply a roll moment on the vehicle body.

FIG. 9 and FIG. 10 illustrate the system as in FIG. 8 where linear actuators 91*a* and 91*b* cooperatively in a cross-linked arrangement to drive rotary actuator 130 however in this embodiment the rotary actuator is driven indirectly. Intervening multi-source pressure intensifiers 190*a* and 190*b* are hydraulically interposed between the rotary actuator and linear actuators 91*a* and 91*b* respectively.

In FIG. 9, the first actuator system 99*a* of the cross-linked suspension arrangement may be, for example, located at the front left corner of a vehicle and the second actuator system 99*b* may be located at the front right corner of the vehicle. Alternatively or additionally, the actuator systems of the arrangement illustrated in FIG. 9 may be located elsewhere in a vehicle, such as for example, at the two rear corners. Alternatively, the actuator systems of the suspension arrangement may be located at, for example, two diagonally opposed corners.

The embodiment in FIG. 10 illustrates the arrangement of FIG. 9, being used to control the motion of the sprung and/or sprung mass of a vehicle. Primary actuators 91*a* and/or 91*b* may be used to apply active and/or passive forces on the vehicle body 106. As illustrated in FIG. 10, forces applied by two actuators 91*a* and 91*b* may be generated by using the hydraulic motor-pumps 98*a* and 98*b*, respectively, to produce a differential pressure across pistons 96*a* and or 96*b*, respectively. Forces applied by these two actuators may be, for example, in the same direction or opposite directions, in phase or out of phase with each other and/or may be applied concurrently or at separate times to, at least in part, control vehicle body heave, pitch and/or roll and/or to control the motion of at least one wheel assembly.

In some embodiments, the hydraulic actuator systems illustrated in FIG. 10 may be used cooperatively to apply a roll moment in the direction 48 to the vehicle body, for example, to counteract the forces induced by lateral acceleration of the vehicle. As illustrated in FIG. 10, a counter-clockwise roll moment may be applied, to for example counteract a clockwise roll moment that is applied to the vehicle by inertial forces, by using pump 98*a* to increase the pressure in extension volume 93*a* relative to the compression volume 94*a*, thus applying a net downward (compressive) force with actuator 93*a*. This differential pressure may also be applied across the multi-source pressure intensifier 190*a* causing volume 92*d* to expand and thus compress volume 92*c* and force fluid into volume 137 of rotary actuator 130. Additionally or alternatively pump 98b may be used to increase the pressure in compression volume 94b relative to the extension volume 93b, thus applying a net upward (extension) force with actuator 93a. This differential pressure may also be applied across the multi-source pressure intensifier 190b causing volume 92h to expand and thus compress volume 92g and force fluid into volume 138 in rotary actuator 130. The resulting increased pressure in volumes 137 and 138 acting on rotatable vane 134 may induce a counterclockwise moment on shaft 135. In some embodiments, the moment of shaft 135 may be applied to an active roll bar in the vehicle in order to augment the roll moment in the direction 48 induced by hydraulic actuators 91a and 91b.

In some embodiments, hydraulic pulsation mitigation filters 108 and 109 may be used, for example, as low pass filters to allow pressure changes that are below a certain frequency threshold to pass through the filter elements without mitigation or effectively without mitigation. The hydraulic filters may also be configured to mitigate or effectively mitigate pressure fluctuations that are higher in frequency than the threshold frequency. In some embodiments the threshold frequency may be, for example, 1 Hz, 2 Hz, 3 Hz, 4 Hz, 5 Hz, 6 Hz, 7 Hz, 8 Hz, 9 Hz, 10 Hz, 11 Hz, 12 Hz, 13 Hz, 14 Hz, or 15 Hz. Other threshold frequencies are also contemplated as the disclosure is not so limited.///

Glossary of Terms

Suspension system: As used herein the phrase "suspension system" of a vehicle is understood to mean a set of components that are interposed between an unsprung mass of a vehicle (e.g., a wheel assembly) and a sprung mass of a vehicle (e.g., the vehicle body) that are configured to control their relative motion. A suspension system may include a plurality of dampers and/or actuators and one or more spring elements (e.g., a coil spring, an air spring), in parallel and/or in series with one or more of the dampers or actuators. A passive suspension system is understood to mean a suspension system of a vehicle that incorporates only passive dampers. A semi-active suspension system is understood to mean a suspension system of a vehicle that includes at least one semi-active damper. An active-suspension system is understood to mean a suspension system of a vehicle that includes at least one actuator capable of applying an intervening force to a first point on an unsprung mass and a second point on a sprung mass of a vehicle. An active suspension system may include linear and/or rotary actuators that may be used to control one or more aspects of the motion of a vehicle body and/or at least one wheel assembly. In certain embodiments of an active suspension system, a linear and/or rotary actuator may be interposed between one end of a spring element and a sprung mass and/or one end of a suspension spring and an unsprung mass.

Road-induced disturbance: As used herein the phrase "road-induced disturbance" is understood to mean of motion a wheel in a direction that is perpendicular to or effectively perpendicular to the road surface that is in contact with the tire.

Inertially induced disturbance: As used herein the phrase "inertially-induced disturbance" is understood to mean motion induced in the vehicle body due to lateral and fore-aft acceleration of the vehicle body.

Actuator: As used herein, the term "actuator" is understood to mean a device capable of applying a force with or without changing a dimension (e.g., extending or compressing its length) or shape (e.g. angular arrangement) in response to a control signal (e.g., an electrical signal). Certain (but not all) types of actuators may include a movable element that moves in a first direction (e.g., upwards, clockwise), relative to a second element (e.g., an actuator housing), in a first mode of operation of the actuator and in a second direction (e.g., downwards, counterclockwise), relative to the second element, during a second mode of operation. In certain implementations, an actuator may be capable of exerting a force and/or torque on an external structure in the direction of motion of the point of application of the force. In certain implementations, an actuator (e.g., an electro-hydraulic actuator) may also be capable of exerting a force and/or torque on an external structure opposite to the direction of motion of the point of application of the force. In certain implementations, an actuator may be capable of exerting a force on an external structure even in the absence of motion of the point of application of the force. In certain implementations, an actuator may function as a passive or semi-active damper. In certain implementations, an actuator may be capable of operating in at least three quadrants of a force-velocity diagram. In certain implementations, an actuator may be capable of operating in all four quadrants of a force-velocity diagram. Implementations of actuators may include an electro-hydraulic actuator, an electro-mechanical actuator (e.g., a ball screw), and an electromagnetic actuator (e.g., a linear motor).

Hydraulic Actuator System: As used herein, a "hydraulic actuator system" is understood to mean a hydraulic system that includes a controller and at least one primary hydraulic actuator and a power-pack that directly powers the primary actuator. In certain embodiments, the power-pack may be used to indirectly power a second actuator in the hydraulic actuator system or directly or indirectly power another actuator cooperatively with a second hydraulic actuator system.

Cross-linked hydraulic actuator systems: As used herein, "cross-linked hydraulic actuator systems" is understood to mean two or more hydraulic actuator systems that exchange fluid with each other or with a common hydraulic device such as a rotary hydraulic actuator.

Spring Perch Actuator: As used herein, a "spring perch actuator" is understood to mean an actuator that is interposed between a suspension spring and a vehicle body and/or a suspension spring and a wheel assembly. A spring perch actuator may be co-located with another actuator, such as in a coil-over arrangement with a linear hydraulic actuator or remotely located arrangement where both actuators are separately interposed between the same two structures. The spring perch actuator may be used to adjust the position of the spring element relative to the sprung mass or unsprung mass of a vehicle.

Compression Volume and Extension Volume: As used herein, a "compression volume" and "extension volume" are understood to mean volumes in the housing of a linear hydraulic actuator that are separated from each other by a piston slidably and sealingly received in the housing of the actuator. A piston rod may be attached to the piston and protrude from the side that is adjacent to the extension volume. The compression volume contracts when the linear actuator is compressed and the extension volume contracts when the actuator is extended.

Active Force: As used herein, an "active force" or component of a force is a force or a component of a force that is applied by an actuator or an external structure that is in the direction of motion of the point of application of the force or the component of the force.

Passive, Damping or Resistive Force: As used herein, a "passive, damping force" or "component of a force" is understood to mean a force or component of a force that is opposed to the direction of motion of the point of application of the force or component of the forces.

Active Torque: As used herein, an "active torque" is understood to mean a torque applied by a rotary actuator on an external structure that is in the direction of rotation of the external structure.

Resistive or Passive Torque: As used herein, a "resistive" or "passive torque" is understood to mean a torque applied by a rotary actuator to an external structure that is in the direction opposed to the rotation of the external structure.

Electro-Hydraulic Power-pack: As used herein, an "electro-hydraulic power-pack" is understood to mean any one of a hydraulic motor-pump operatively coupled to an electric motor-generator, a hydraulic pump operatively coupled to an electric motor, or a hydraulic motor operatively coupled to an electric generator. An electro-hydraulic power-pack may consume electrical power to produce a flow of pressurized hydraulic fluid or may receive pressurized hydraulic flow and convert hydraulic power to electrical power.

Primary Hydraulic Actuator: As used herein, a "primary hydraulic actuator" is understood to mean an actuator that is driven or powered directly by a power-pack where pressurized hydraulic fluid from the hydraulic component of the power-pack (e.g., a hydraulic motor, hydraulic pump, hydraulic motor-pump) is exchanged with at least one volume in the actuator housing. An actuator is powered or driven indirectly by a power-pack when pressurized hydraulic fluid is not exchanged between one or more volumes in the actuator housing and the hydraulic component in the power-pack. An actuator may be powered or driven indirectly by a power-pack when pressure produced by the hydraulic component is used to pressurize fluid supplied to the actuator by an intervening device such as, for example, a pressure intensifier.

Hydraulic motor-pump: As used herein, a "hydraulic motor-pump" is understood to mean a hydraulic device that is capable of converting mechanical kinetic energy into a fluidic pressure difference in a first operational mode and capable of converting fluidic pressure difference into mechanical kinetic energy in a second operational mode. A hydraulic motor-pump may be a hydraulic pump or a hydraulic motor.

Motor-generator: As used herein, a "motor-generator" is an electromechanical device that is capable of converting electrical energy into mechanical kinetic energy in a first operational mode and/or capable of converting mechanical kinetic energy into electrical energy in a second operational mode. A motor-generator may be an electric motor or an electric generator.

Operatively coupled: A motor-generator is said to be "operatively coupled" to a pump when (i) causing the rotation of a rotor of the motor-generator results in a rotation of one or more rotatable elements of the pump and/or (ii) causing the rotation of a rotatable element of the pump results in a rotation of the rotor of the motor-generator.

Damper: As used herein, the term "damper" is understood to mean a device capable of changing a dimension (e.g., extending or compressing its length). A damper may include a movable element (e.g., a piston) that moves, relative to a second element (e.g., a damper housing), in a first direction (e.g., vertically upwards) during extension of the damper and in a second direction (e.g., vertically downwards) during compression of the damper. A damper is further characterized in that, in response to the mechanical force causing the change in dimension of the damper, a resistive force may be exerted on the movable element in a direction opposite the direction of its motion, thereby resisting the motion. A magnitude of the resistive force may be related to both a velocity of said motion of the movable element and a damping coefficient. Unlike an actuator, a damper is not capable of generating and applying a force to the movable element in the direction of the motion of the movable element. Further, unlike an actuator, a damper typically is not capable of generating and applying a force to the movable element in the absence of motion of the movable element. A damper may therefore be said to operate in a maximum of two quadrants (e.g., quadrant I and III) of a force-velocity diagram. However, a damper coupled to a source of hydraulic pressure, such as for example a hydraulic pump, may operate as an actuator.

Passive damper: As used herein, passive damper is understood to mean a damper with effectively a constant damping coefficient, such that the magnitude of the resistive force applied to the movable element in response to its motion is effectively a function only of the velocity of the motion at a given temperature and a damping coefficient.

Semi-active damper: As used herein, a semi-active damper is understood to mean a damper in which it is possible to intentionally vary or control a damping coefficient. In certain semi-active dampers, the magnitude of the resistive force applied to the movable element during motion may be selectively controlled—however, the direction of the resistive force may not be controlled as said direction is necessarily in a direction opposite the motion of the movable element.

In fluid communication: As used herein, in fluid communication may encompass, for example, hydraulic and pneumatic communication. As used herein, the term compressible fluid is understood to mean gas or vapor. Fluid communication between two volumes or devices is present if a quantity of fluid may flow between the devices without flowing through a hydraulic motor, pump, or motor-pump.

Electric machine: As used herein, the term "electric machine" is understood to mean an apparatus that is configured to convert mechanical energy to electrical energy in one operating mode and from electrical energy to mechanical energy in another operating mode. Examples of an electric machine include, electric motor, electric generator, electric motor operating as a generator, and an electric generator operating as an electric motor.

Hydraulic machine: As used herein, the term "hydraulic machine" is understood to mean an apparatus that is configured to convert mechanical energy to hydraulic energy in one operating mode and hydraulic energy to mechanical energy in another operating mode. Examples of an hydraulic machine are: a hydraulic pump, a hydraulic motor, a hydraulic motor operating as a hydraulic pump and a hydraulic pump operating as a hydraulic motor.

Hydraulic circuit: As used herein, the term "hydraulic circuit" is understood to mean a set of two or more components (e.g., pumps, tubes, hoses, pipes, loads, chambers, reservoirs, tanks, valves, orifices, ports, etc.) that are configured and arranged to form a flow path for hydraulic fluid, wherein each component of the set is in fluid communication with at least one other component of the set. The term is understood to encompass both closed hydraulic circuits and open hydraulic circuits. As used herein, the term reservoir or accumulator s understood to mean a volume capable of receiving fluid from a hydraulic circuit and/or supplying fluid to the hydraulic circuit.

Hydraulic Multi-source Pressure Intensifier: As used herein, the term "hydraulic multisource pressure intensifier" is understood to mean a passive hydraulic device With at least a first and a second chamber that are in fluid communication with at least a first and a second volume that are at a first and a second pressure and a third chamber where the pressure is a function of the first and second pressures in the first and second chambers and that is also in fluid communication with a third volume.

Hydraulic Pulsation Filter. As used herein, the term "hydraulic pulsation filter" is understood to mean a hydraulic device that permits flow fluctuations or pulsations at or below a first frequency to pass through without mitigation or with negligible mitigation while flow fluctuations above the first frequency are mitigated to a higher degree or effectively eliminated.

Mutually Sealed Chambers in a Housing: As used herein, the term "mutually sealed chambers" or mutually sealed chambers in a housing" are understood to mean two or more chambers that are sealed to prevent fluid exchange between them inside the housing. However, such chambers may have ports that allow the exchange of fluid externally or with volumes that are external to the chamber.

The invention claimed is:

1. An active suspension system of a vehicle comprising:
    a first actuator assembly that includes:
        a first primary hydraulic actuator directly driven by a first hydraulic motor-pump; and
        a first perch actuator indirectly driven by the first hydraulic motor-pump,
        wherein the first primary hydraulic actuator includes a first compression volume and a first extension volume, and
        wherein the first actuator assembly includes a first multi-source hydraulic intensifier with a first port in fluid communication with the first compression volume, a second port in fluid communication with the first extension volume, and a third port in fluid communication with a first volume of the first perch actuator.

2. The system of claim 1, further comprising a second actuator assembly that includes: a second primary hydraulic actuator directly driven by a second hydraulic motor-pump and a second perch actuator indirectly driven by the second hydraulic motor-pump, wherein the second primary hydraulic actuator includes a second compression volume and a second extension volume.

3. The system of claim 2, wherein the second actuator assembly includes a second multi-source hydraulic intensifier with a first port in fluid communication with the second compression volume, a second port in fluid communication with the second extension volume, and a third port in fluid communication with a second volume of the second perch actuator.

4. The system of claim 3, wherein the first multi-source hydraulic intensifier has a fourth port that is in fluid communication with a fourth port of the second multi-source hydraulic intensifier.

5. The system of claim 2, wherein the first perch actuator is interposed between a first suspension spring and a first wheel assembly and a second perch actuator is interposed between a second suspension spring and a second wheel assembly.

6. The system of claim 5, wherein the first suspension spring is in a coil-over arrangement with the first primary hydraulic actuator and the second suspension spring is in a coil-over arrangement with the second primary hydraulic actuator.

7. The system of claim 2, wherein the first primary hydraulic actuator of the first actuator assembly is interposed between a first wheel assembly and a body of the vehicle and the second primary hydraulic actuator of the second actuator assembly is interposed between a second wheel assembly and the body of the vehicle.

8. An active suspension system for a vehicle comprising:
    a first hydraulic actuator assembly that includes a first primary hydraulic actuator directly driven by a first hydraulic device, wherein the first primary hydraulic actuator includes a first compression volume and a first extension volume;
    a second hydraulic actuator assembly that includes a second primary hydraulic actuator directly driven by a second hydraulic device, wherein the second primary hydraulic actuator includes a second compression volume and a second extension volume; and
    a rotary hydraulic roll bar actuator operatively coupled to a roll bar and configured to be driven by a combination of the first hydraulic device and the second hydraulic device,
    wherein, in at least one mode of operation, the first primary hydraulic actuator, the second primary hydraulic actuator and the rotary hydraulic roll bar actuator cooperatively apply a roll moment to a vehicle body of the vehicle.

9. The system of claim 8, wherein the rotary hydraulic roll bar actuator includes a first chamber that is in fluid communication with the first compression volume, a second chamber that is fluid communication with the first extension volume, a third chamber that is in fluid communication with the second compression volume, and a fourth chamber that is fluid communication with the second extension volume and wherein in at least one mode of operation the first hydraulic device produces a pressure differential between the first chamber and the second chamber that induces a first roll moment in the roll bar and the second hydraulic device produces a pressure differential between the third chamber and the fourth chamber that induces a second roll moment in the roll bar.

10. The system of claim 9, wherein the first roll moment and the second roll moment are in a same direction.

11. A passive multi-source hydraulic pressure intensifier, comprising:
    a housing including a first chamber, a second chamber, and third chamber, each chamber being a mutually sealed variable volume chamber, wherein each chamber is at least partially filled with a fluid at a first pressure, a second pressure, and a third pressure respectively; and
    a multi-surface piston assembly that includes: a first piston with a first surface exposed to the first pressure and a second surface exposed to the second pressure, and a second piston with a third surface exposed to the third pressure, wherein the first piston and second piston are fixedly attached to opposite ends of an intervening piston rod, and wherein relative volumes of the first chamber, the second chamber, and the third chamber are a function of a position of the multi-surface piston assembly relative to the housing,
    wherein a pressure in the first chamber is a function of at least pressures in the second chamber and the third chamber in at least one mode of operation.

12. The passive multi-source hydraulic pressure intensifier of claim 11, further comprising a first port fluidly connecting the first chamber to a first external volume and a second port fluidly connecting the second chamber to a second external volume, wherein the first chamber and the second chamber are at least partially filled with hydraulic fluid, and wherein pressures in the first external volume and the second external volume are determined by at least one external pressure source.

13. The passive multi-source hydraulic pressure intensifier of claim 12, further comprising a third port fluidly connecting the third chamber to a third external volume.

14. The passive multi-source hydraulic pressure intensifier of claim 13, wherein the first external volume is a compression volume of a primary actuator of a first actuator assembly, the second external volume is an extension volume of the primary actuator of a first actuator assembly, and the third external volume is an internal volume of a spring perch actuator.

15. The passive multi-source hydraulic pressure intensifier of claim 14, wherein the primary actuator is a first primary actuator, and further comprising a fourth chamber that is at least partially filled with hydraulic fluid, a fourth port that fluidly connects the fourth chamber to a chamber in a second multi-source hydraulic intensifier in a second actuator assembly, that includes a second primary actuator and a second spring perch actuator, by means of a fluid flow path; wherein the fourth port is also in selective fluid communication with a fluid reservoir that is one of a reservoir that is open to atmosphere and a pressurized reservoir.

16. The passive multi-source hydraulic pressure intensifier of claim 15, wherein the first actuator assembly and second actuator assembly are a part of an active suspension system of a vehicle, and wherein the first primary actuator and the second primary actuator and first spring perch actuator and second spring perch actuator are configured to work cooperatively to apply a moment on a vehicle body of the vehicle.

17. The passive multi-source hydraulic pressure intensifier of claim 12, wherein the third chamber is at least partially filled with a gas.

* * * * *